Oct. 9, 1962　　　A. J. C. OLSEN　　　3,057,785
FERMENTATION VESSEL AND PROCESS
Filed Oct. 15, 1959　　　　　　　　2 Sheets-Sheet 1
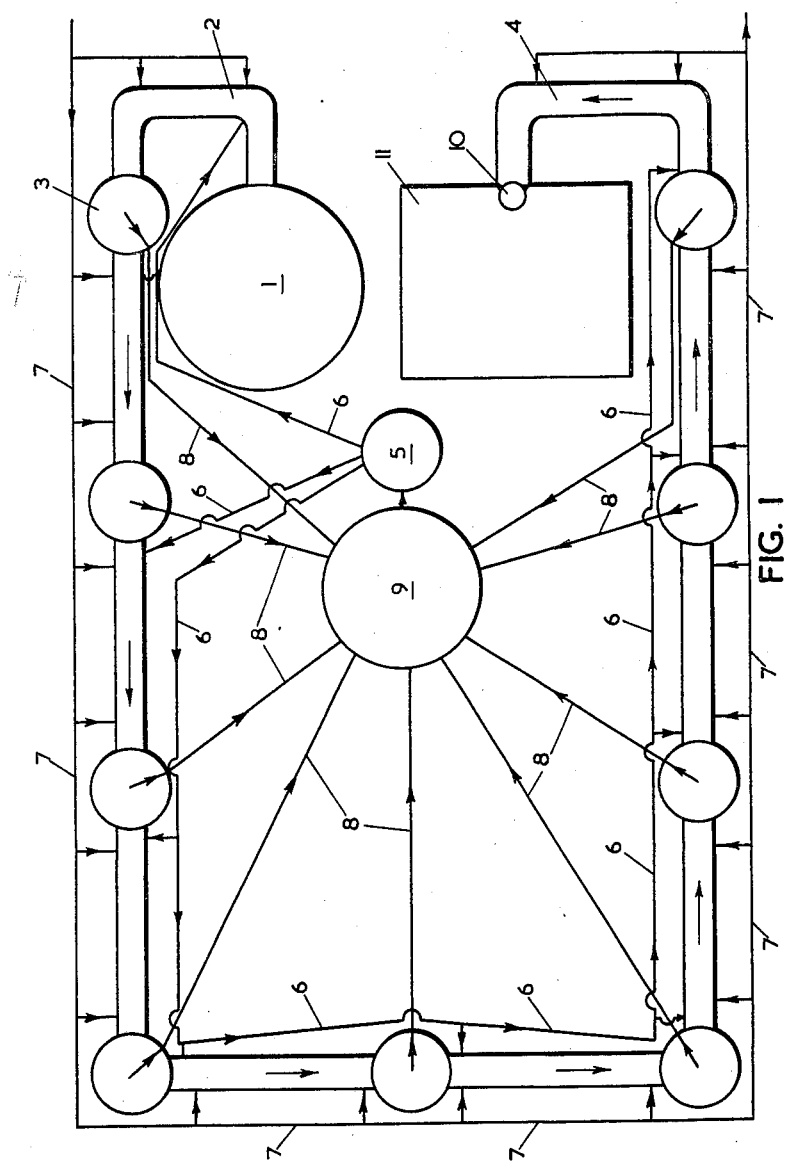
FIG. I Oct. 9, 1962  A. J. C. OLSEN  3,057,785
FERMENTATION VESSEL AND PROCESS
Filed Oct. 15, 1959  2 Sheets-Sheet 2
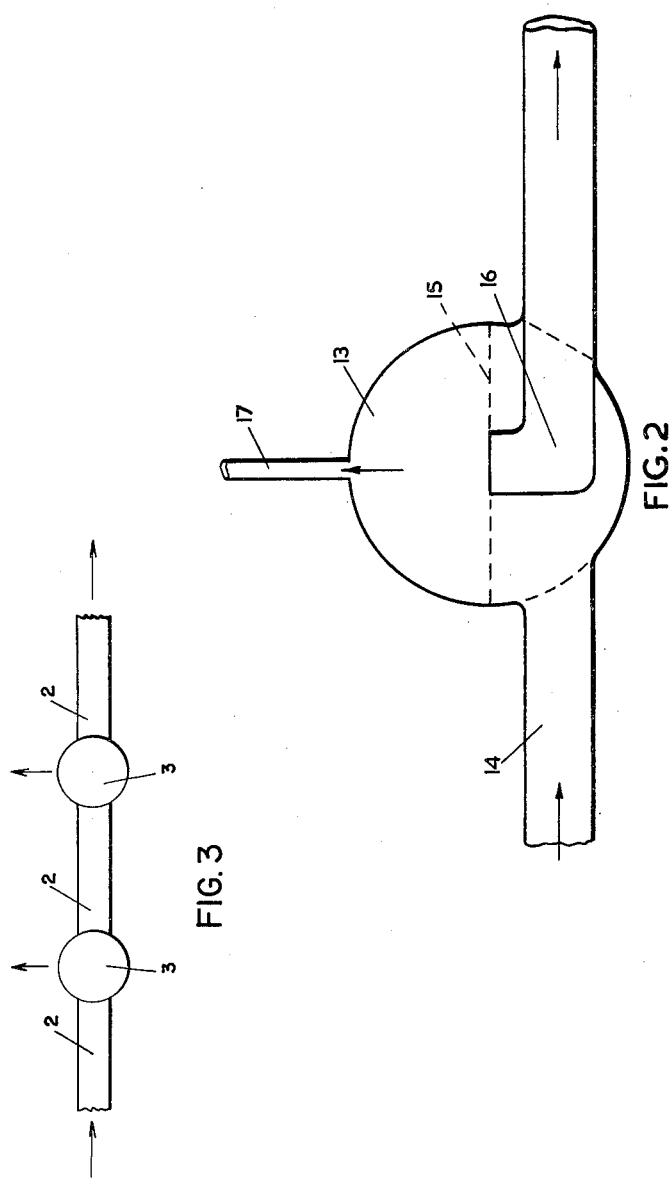
Inventor
A. J. C. Olsen
by Albert Jacobs
Attorney

United States Patent Office 3,057,785
Patented Oct. 9, 1962

3,057,785
FERMENTATION VESSEL AND PROCESS
Arne Jorgen Carl Olsen, Coombe Park, Kingston Hill, England, assignor to The Distillers Company Limited, Edinburgh, Scotland, a British company
Filed Oct. 15, 1959, Ser. No. 846,746
5 Claims. (Cl. 195—95)

The present invention relates to a fermentation vessel of improved design and to methods of using it.

Fermentations, and particularly yeast fermentations, are commonly carried out in single vessels of large capacity, for example containing 10,000 to 20,000 gallons of fermenting wort to which nutrients are added and through which air is passed during the multiplication of the yeast cells.

In order to obtain the maximum yield of yeast based upon the amount of carbohydrate added it is necessary to pass very large volumes of air through the medium, for example of the order of 500,000 cubic feet of air for each ton of yeast produced. Not only is the compression and subsequent handling, of quantities of air of this order a difficult and expensive process, but the passing of large volumes of air through the medium causes considerable frothing of the fermentation medium. The latter difficulty can only be overcome by the provision of a considerable empty volume above the medium which is unproductive. Additionally, antifrothing compounds are frequently added to the medium to reduce the amount of frothing. Such compounds are expensive and comprise a considerable item in the cost of the fermentation. It is apparent, therefore, that if the amount of gas to be passed through the medium can be reduced, the cost of fermentations may be reduced.

It is an object of the present invention to provide a fermentation vessel in which the unproductive space above the medium can be reduced. It is a further object of the invention to provide a continuous process for the production of yeast using this fermentation vessel wherein a decreased amount of gas can be used for aeration.

Accordingly, the present invention is a fermenter comprising an elongated substantially fluid-tight vessel, preferably having its longer axis horizontal, the vessel being divided into sections which intercommunicate for the passage of liquids and gases, at least the majority of the sections being provided with means for introducing liquids and gases, means positioned between the sections for withdrawing gases from at least one of said sections, and means positioned at the end of the vessel for continuously withdrawing liquid therefrom.

It is preferred that the elongated vessel shall be in the form of a pipe-line of considerable length. The exact length of the vessel will depend mainly upon the diameter of the vessel and the desired output of yeast required. In view of its considerable length it may be convenient to provide convolutions in the pipe-line to restrict the area of floor space covered, for example, the pipe-line may be coiled upon itself to form a relatively high structure.

It is preferred that the pipe shall be of circular internal cross section for ease of manufacture and cleaning, but vessels having other cross sections may be used.

As described later, the pipe may be of constant width, for example in the range about 6" to 20", or it may be of increasing width in the direction of flow of the yeast-containing medium.

The vessel is divided into sections which intercommunicate for the passage of yeast-containing medium. The sections may be conveniently separated by pipes of decreased width, if necessary containing one way valves or by a system of baffles or similar structure, which prevent substantial mixing of yeast-containing medium in one section with that contained in the sections on either side until the medium passes to the next section in the direction of flow of the medium through the vessel.

The insertion into the fermenter of valves, baffles, pumps or pipes of decreased width assists in providing turbulent flow of liquid in the fermenter, which is very desirable in the contacting of the yeast cells with nutrients and oxygen.

At least the majority of the sections are provided with orifices, venturis or injectors through which nutrient solutions and oxygen gas may be introduced into the sections.

By the use of oxygen in the fermentation process the amount of gas which is to be passed through the medium is considerably reduced when compared with the amount of air required and may be, for example only about $\frac{1}{66}$th of the volume of air required. Thus the empty volume required above the medium is correspondingly reduced or eliminated making possible and advantageous the use of the fermentation vessel of the present invention.

When using oxygen, therefore, the vessel of the present invention can be kept almost or completely full of nutrient medium which is then passed in a continuous stream through the vessel as fermentation takes place. Oxygen and nutrient liquids may be supplied to the medium at any number of suitable points in the sections through which the yeast-containing medium passes.

It is preferred that oxygen is supplied under superatmospheric pressure to the sections, and that the vessel is of sufficient strength to withstand this pressure. By supplying the oxygen at increased pressure the solubility of the oxygen in the medium is increased and thus its utilisation by the yeast is also increased.

In order to utilise the oxygen as completely as possible, since this is more expensive than air, the unutilised gas passing through the medium is withdrawn from the vessel, scrubbed to remove carbon dioxide and recirculated through the medium. Slight positive pressure may be required in such circumstances to overcome the resistance to the gas flow in the scrubbers and this may be provided by the pressure at which the oxygen is introduced into the medium or it may be pumped from the vessel to the scrubbers.

Oxygen which has not been utilised together with $CO_2$ and other by-products may be removed from the vessel between the sections by any convenient means, for example enclosed volumes, preferably of spherical form, may be provided between the sections in the vessel in which reduced pressure is maintained and preferably in which the liquid surface area/volume ratio is increased when compared with that of the sections and from which the dissolved gases are withdrawn to the scrubbers. Alternatively, if desired, there may be included between sections pumps such as those of the type known as de-aeration pumps which separate liquid and gases from a mixture. The liquid is then passed to the next section in the direction of flow and the gases are passed to scrubbers for purification before re-use.

The sections of the vessel are constantly maintained under suitable conditions such as nutrient feed, yeast concentration, pH value, temperature, growth modulus and rate of oxygenation which are required for the production of yeast of commercially acceptable quality, the yeast cells being exposed to these conditions as they pass through the sections successively before recovery. The greater number of sections in which conditions are controlled the more accurate is the control of growth and quality.

The nutrients, and water if required, are preferably introduced, for example through venturis or injectors, at the beginning of the sections to control the conditions of yeast growth in that section.

The volume of yeast-containing medium passing along the vessel is, of course, increasing due to the growth of yeast and to added nutrient solutions and water, if added, and it is necessary, therefore, if it is desired to provide the same retention time in all sections to increase the volume of the sections in the direction of flow of the medium. This may be accomplished either by increasing the length of the section where a constant cross section vessel is used or by the use of sections of increasing diameter. If yeast is grown exponentially it will be necessary that the volume of the sections increases exponentially in such cases.

Alternatively, the vessel may have sections of equal length and cross section, in which case the yeast retention time in each section will decrease in the direction of flow.

It has been found that in order to produce yeast of good commercial quality a "ripening stage" is advantageous before recovery. This comprises the exposure of the yeast cells to conditions of reduced oxygenation and nutrient concentration, for example for a period suitably of about 1 to 2 hours. This may be achieved in the present invention by the provision of an additional section of sufficient volume to provide the necessary residence time to which the nutrient feed is reduced or preferably stopped and in which the rate of oxygenation is reduced or stopped.

Means are provided in the end of the vessel to withdraw yeast-containing medium continuously from the ripening stage. Such means may consist of an orifice or valve and pipe leading to the recovery stage, or a pump or similar device may be used. The means provided should be able to control the rate of passing the yeast-containing medium from the ripening stage to the recovery stage which may be a centrifuge or filtration plant.

The process in the vessel may be commenced by introducing yeast and nutrient medium into the first section of the vessel and thereafter adding nutrients and oxygen to this section to provide growth of the yeast to a predetermined concentration and volume. Continuous transfer of the medium is then commenced to the next section where the process is repeated while maintaining the desired concentration of cells and volume of medium in the first section. The process is repeated through the remaining sections of the vessel until the ripening section is reached.

When all fermentation sections are operating at constant volume and concentration of cells continuous withdrawal of yeast-containing medium is commenced from the ripening stage at such a rate as to maintain the concentrations of cells and volumes in the preceding sections.

Alternatively, the system may be completely filled from a separate fermentation vessel of conventional design containing sufficient yeast-containing medium to fill the fermenter of the present invention in a short time after which nutrients and oxygen are fed to the filled sections and the continuous process then commences.

Yeast may be recovered from the process by any suitable method, for example by filtration and/or by centrifugal separation.

As noted previously the length of the fermentation vessel will depend in part upon the diameter of the vessel and the desired output from the vessel. Other factors which determine the size of the vessel are the concentration of yeast cells in the yeast-containing medium and the hourly growth rate of the yeast "K" when a predetermined output of yeast is required.

For example, in the case of a vessel of 50 cms. diameter and of constant circular cross section throughout which is designed to produce 1000 kilograms of yeast per hour under operating conditions of 100 grams of yeast per litre of medium and an hourly growth rate of 1.20, the vessel must contain $$\frac{1000}{K-1}$$

kilograms of yeast or 5000 kilograms to produce the required amount of yeast per hour.

Since the yeast concentration is 100 grams per litre, the volume of the medium in the vessel must be 50,000 litres to contain the required amount of yeast.

Since the diameter of the vessel is 50 cms. and the volume of the vessel at least 50,000 litres, the minimum length of the vessel "L" can be found by the equation:

$$\frac{\pi}{4} (2500) \text{ square cms.} \times L \text{ cms.} = 50,000,000 \text{ cu. cms.}$$

$$L = 25500 \text{ cms.} = 255 \text{ metres.}$$

Owing to the large surface area of the vessel in relation to the volume of medium cooling is rendered easier than in conventional fermentation vessels, for example cooling jackets around some sections only of the vessel may suffice.

In the diagrammatic drawing accompanying the specification FIGURE 1 shows one embodiment of the invention in which the sections of the fermenter are of equal volume. FIGURE 2 shows a section through a gas withdrawal means of spherical form between two sections.

FIGURE 3 is a fragmentary illustration of gas withdrawal spheres and associated fermenter sections.

In the operation of the device shown in FIGURE 1, yeast is grown in a conventional fermentation vessel 1 until a predetermined volume of medium containing a predetermined concentration of yeast is present. Yeast-containing medium is then passed into the first section 2 of the fermenter and through gas withdrawal sphere 3, then through the remaining sections and gas withdrawal spheres until the fermenter is substantially full. Oxygen is then supplied to pump 5 and is pumped via pipes 6 to the beginning of each section. Liquid nutrient solutions are fed to the sections via pipes 7. Provision is made for varying the rate of oxygen supply and nutrients to section 4 which acts as the ripening stage.

Gas is withdrawn from the yeast-containing medium along pipes 8 as it passes through the gas withdrawal spheres and this gas is passed to the scrubber 9 where impurities such as carbon dioxide are removed.

Purified oxygen from the scrubber is then returned to pump 5 and is recirculated to the sections through pipes 6.

Yeast-containing medium is continuously withdrawn through valve 10 and passes to the recovery stage 11 consisting of a centrifugal or filtration plant.

The rate of withdrawal of yeast-containing medium through valve 10 to the recovery stage is adjusted to maintain a constant volume of medium and concentration of yeast cells in the sections of the fermenter.

In FIGURE 2 yeast-containing medium enters the sperical gas withdrawal space 13 from section 14 and rises to the level 15 of the outlet pipe 16 to the next section. Due to the increase in surface area of the medium when passing from section 14 to the gas withdrawal space 13, dissolved gases, largely oxygen and carbon dioxide, are released from the liquid and are withdrawn via pipe 17 to the scrubber where impurities such as carbon dioxide and aldehydes are removed from the oxygen.

I claim:

1. A fermenter for use in continuous yeast fermentation, comprising an elongated fluid-tight vessel divided into a series of sections which intercommunicate for the passage of liquid, each succeeding section being greater in volume than the preceding section, means positioned between adjacent sections for withdrawing gas from said sections, means for washing and recirculating said withdrawn gas back to the vessel and means positioned at one end of the vessel for withdrawing liquid therefrom.

2. A continuous process for the production of yeast comprising growing yeast in a first zone while introducing nutrients, liquid and oxygen into the zone until an increased concentration of yeast cells and volume of medium is present, thereafter continuously passing yeast-containing medium from the first zone while removing gases from the medium to a second zone, introducing nutrient liquid and oxygen to the second zone and allowing the number of yeast cells and volume of medium to increase, thereafter continuously passing the yeast-containing medium through at least one other zone while removing gas from the medium before continuously withdrawing yeast containing medium from the last zone and thereafter maintaining the concentration of yeast cells and volume of medium at a constant value by adjusting the rate of fresh addition of nutrients, liquid and oxygen while continuously withdrawing the yeast-containing medium.

3. A continuous process for the production of yeast comprising growing yeast in a series of communicating zones until yeast-containing medium is present in all such zones, introducing fresh liquid, nutrients and oxygen into the zones to maintain a constant concentration of yeast cells and volume of medium, withdrawing gas between zones and continuously withdrawing yeast-containing medium from the last zone and recovering the yeast therefrom.

4. A fermenter as claimed in claim 1 wherein the means for withdrawing gas comprises an enclosed volume of greater cross-sectional area than that of the preceding section.

5. A fermenter as claimed in claim 1 wherein the means for withdrawing gas comprises a pump adapted to separate a mixture of gas and liquid.

References Cited in the file of this patent

UNITED STATES PATENTS

| | | |
|---|---|---|
| 1,732,921 | Bratton | Oct. 22, 1929 |
| 1,761,789 | Harrison | June 3, 1930 |
| 2,123,463 | Effront | July 12, 1938 |
| 2,353,771 | Szucs | July 18, 1944 |
| 2,657,174 | Stich | Oct. 27, 1953 |